July 1, 1930.  C. S. PINKERTON ET AL  1,769,358
METHOD OF AND APPARATUS FOR ASCERTAINING
THE RATE OF FLOW OF FLUIDS
Filed April 1, 1922  2 Sheets-Sheet 1
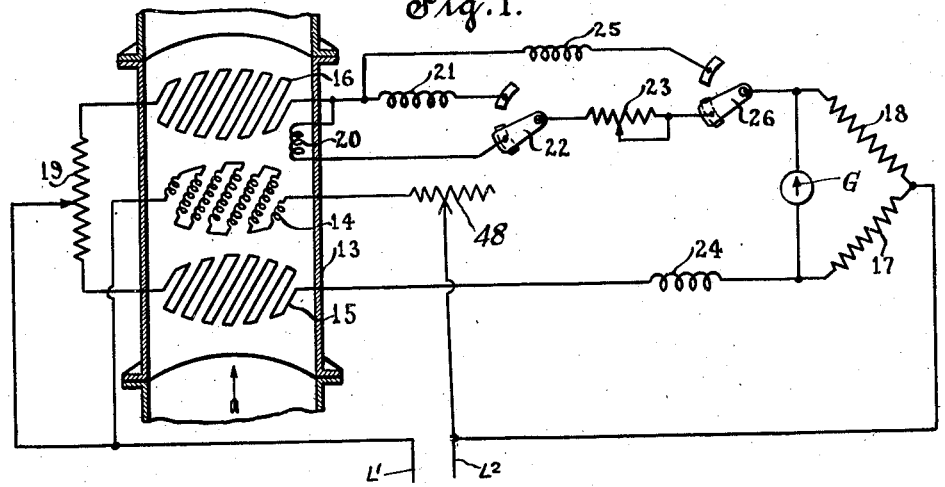
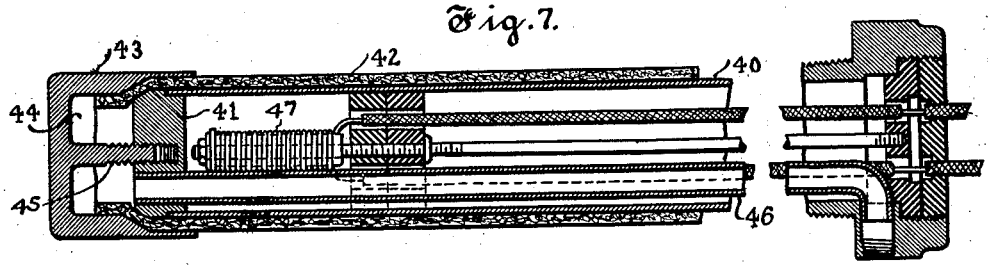
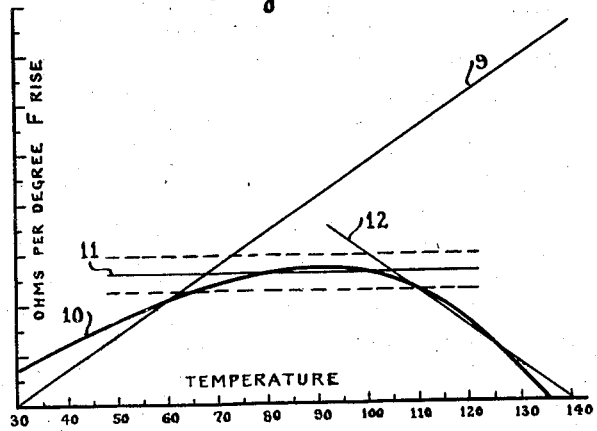
INVENTORS.
Clarence S. Pinkerton
Wilbur H. Greenwood
BY
ATTORNEY.

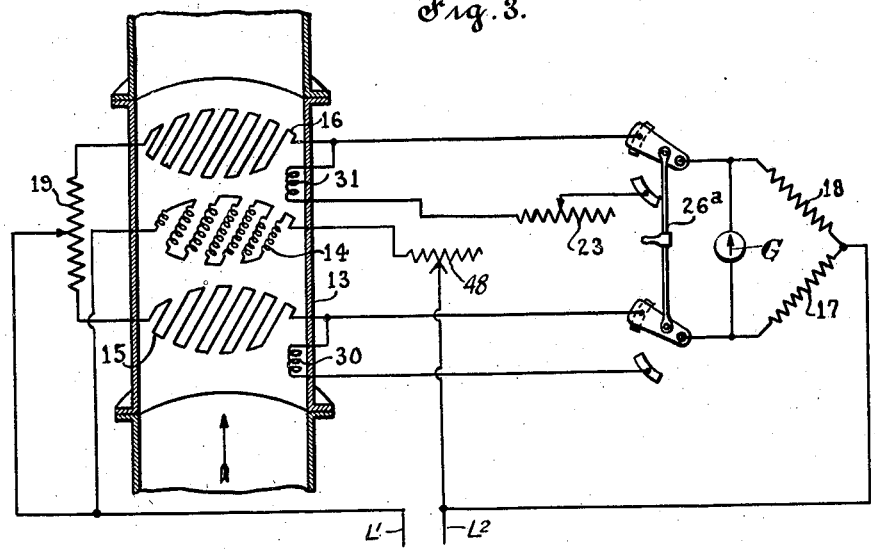
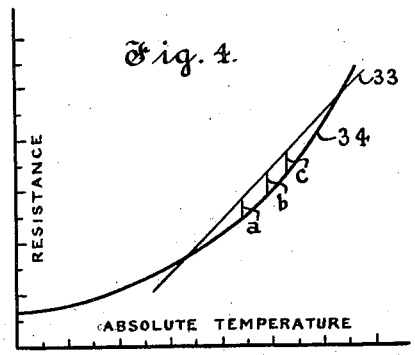
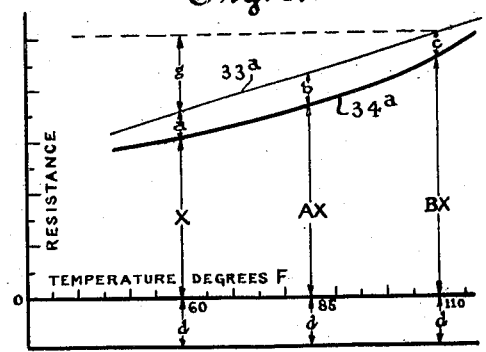
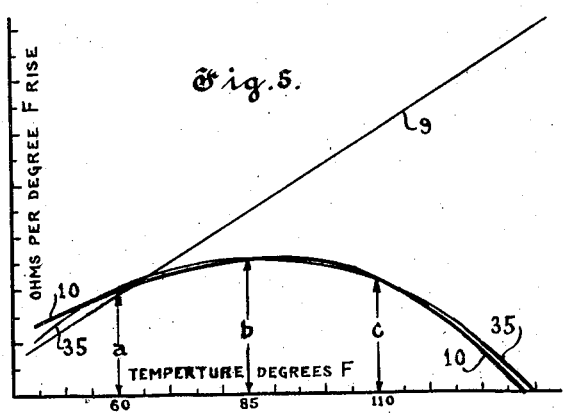

Patented July 1, 1930

1,769,358

UNITED STATES PATENT OFFICE

CLARENCE S. PINKERTON, OF MILWAUKEE, AND WILBUR H. GREENWOOD, OF WAUWATOSA, WISCONSIN, ASSIGNORS, BY MESNE ASSIGNMENTS, TO CUTLER-HAMMER, INC., A CORPORATION OF DELAWARE

METHOD OF AND APPARATUS FOR ASCERTAINING THE RATE OF FLOW OF FLUIDS

Application filed April 1, 1922. Serial No. 548,721.

This invention relates to method of and apparatus for ascertaining the rate of flow of fluids. More particularly the invention relates to method of and means for obviating certain errors which may ordinarily occur in the determinations effected by fluid meters and the like.

The invention, while not limited thereto is particularly applicable to fluid meters of the character disclosed and claimed in Patent No. 1,222,492 of April 10, 1917 to C. C. Thomas.

Briefly described, the meter disclosed in said patent involves the use of a heater to supply heat energy to the stream of fluid whose rate of flow is to be metered, a pair of resistance thermometers to take the temperature of the fluid respectively before and after heating and means under control of said resistance thermometers for regulating the supply of energy to the heater to maintain substantially a constant temperature rise of the fluid, whereby the quantity of energy supplied to the heater in a given time constitutes a measure of the quantity of fluid flowing during the same time.

For control of the energy input to the heater the resistance thermometers are connected in corresponding branches of a Wheatstone bridge and a galvanometer is subjected to control by the bridge for effecting and controlling actuation of a rheostat or its equivalent for direct control of such energy input to the heater.

Such meters are adapted under most conditions to measure with great accuracy. However the same when acting under certain special conditions are subject to certain errors which, if uncompensated, tend to affect unduly the accuracy of the measurements obtained.

Thus the effective specific heat of the gas or other fluid being metered may vary considerably due to variation in chemical constitution of the fluid itself or to variation in its vapor content, such latter factor being in turn influenced by variations in basic temperature of the fluid, that is to say the temperature of the fluid immediately prior to metering and all of such variations tend to reduce the accuracy of the measurements obtained.

In Patent No. 1,261,086 of April 2, 1918 to J. C. Wilson and H. N. Packard are disclosed method and apparatus for temperature regulation particularly applicable to meters of the character specified for increasing the accuracy of the meter.

According to said latter cited patent, a so-called temperature difference resistance is connected in series with one of the resistance thermometers while the meter is in operation but is adapted to be excluded from circuit during balancing of the Wheatstone bridge preparatory to metering, whereby the value of such temperature difference resistance becomes, as its name implies, a measure of the temperature difference which the meter is adapted automatically to maintain between the entrance and exit resistance thermometers. Said temperature difference resistance is arranged within the fluid stream and hence subjected to influence of variations in basic temperature of the fluid. Thus, being composed of material adapted to change its resistance with variations in temperature within a given range, such resistance is adapted to exert, upon the temperature difference maintained by the meter, a variable influence proportional to such changes in basic temperature, to thereby correct for certain errors or tendencies toward error due to such changes.

More particularly the foregoing expedients provide adequate compensation for errors due to variation in specific heat of the fluid per standard cubic foot, with variations in temperature between certain limits.

However, it is well known that gases having access to water, as in the seals of ordinary gas producing and storing apparatus, absorb an amount of vapor which increases with increase in temperature of the fluid. Also since the specific heat of the fluid rises with increase in its vapor content, it follows that more heat is required to raise the temperature of a saturated gas one degree above a higher basic temperature than is required to raise the same quantity of saturated gas one degree above a lower basic temperature.

But since in meters of the character stated the value of the heat input must be maintained exactly proportional to the rate of flow of the fluid reduced to standard conditions of temperature pressure and saturation, it is necessary that the temperature rise maintained by the meter be decreased with increasing basic temperature of the fluid. In order to compensate for variations in vapor content and temperature above a given value it is proposed to design temperature difference coils so that with rising temperature the difference in their resistance decreases, i. e., the combination must exhibit a negative slope characteristic, that is to say, the characteristics of a material adapted to reduce its resistance upon increase in temperature.

The present invention has among its objects that of providing a method of and apparatus for providing in temperature responsive devices the aforementioned characteristics.

Another object is that of providing an improved method and apparatus for temperature regulation and determination particularly applicable to increase the accuracy of meters of this class.

Another object is that of providing for automatic compensation for certain variations in character, constituency or physical condition of the fluid to be metered, which variations tend to impair the accuracy of the determinations effected.

Another object is that of providing for utilization of resistance materials having positive temperature co-efficients for attainment of operative effects similar to those which would be exhibited by a temperature difference resistance having a negative temperature co-efficient that is to say whereof the resistance tends to decrease upon increase in temperature.

Another object is that of providing for utilization of such effect to compensate in the operation of meters and the like for variations in chemical constitution and other factors influencing the specific heat per unit quantity of the fluid undergoing metering and also to correct for relatively wide variations in basic temperature of the fluid.

Other objects and advantages will hereinafter appear.

In the accompanying drawing wherein are illustrated certain of the embodiments which the invention may assume in practice;

Figure 1 is a diagrammatic view illustrating a given embodiment thereof;

Fig. 2 is a diagrammatic view showing certain characteristic curves pertaining to the action of the device of Fig. 1;

Fig. 3 is a diagrammatic illustration of a slightly modified construction;

Figs. 4, 5 and 6 are curves illustrating more fully certain features of operation of said latter construction; while Fig. 7 is a vertical sectional view illustrating certain structural details.

Referring first to Fig. 2 of the drawing, the straight line curve indicated at 9 represents the ohmic change in resistance of a typical electrical resistance thermometer under conditions of steadily rising temperature. Also this straight line curve may represent under like conditions the resistance change of a temperature difference coil adapted to maintain a constant temperature difference of, for example, 1° in the fluid between the two similar resistance thermometers operating in accordance with the teaching of the Thomas patent aforementioned, under different conditions of basic temperature of the fluid.

The curve 10 represents the successive values of the ohmic resistance of a temperature difference resistance which would completely and automatically adjust the temperature rise in the meter to compensate exactly for variations in the amount of water vapor in the saturated gas from the standard quantity, such standard being regarded as the condition wherein the fluid is saturated at 60° F., and for other changes in specific heat of the gas induced or influenced by temperature variations.

It is not possible by any means at present known to devise a temperature difference resistance having exactly the characteristics depicted in said curve 10. However, it is to be observed that a straight line occupying substantially the position and slope of the line indicated at 11 very closely approximates the contour of the curve 10 throughout that portion of its extent which corresponds to the region between substantially 55° and 100° F. of temperature of the fluid. Also a straight line curve having the position and slope of the line indicated at 12 similarly adequately fulfills the requirements covering the region from approximately 100° to 130° F. temperature of the fluid.

We have found that it is possible in practice to devise a system of resistances which may be utilized to simulate the action depicted in the two straight line curves 11 and 12 individually and such arrangement will now be described, it being understood that for basic temperatures of the fluid between substantially 55° and 100° F. one combination of resistances is to be employed, whereas, for higher temperatures a different combination is to be employed.

Referring now to Fig. 1 of the drawing the same illustrates certain essential elements of a meter of the type aforedescribed such elements comprising a conduit 13 for the flow of fluid to be metered and an electrical heating element 14 to be supplied, subject to suitable control, from a suitable source of electrical energy, as indicated by lines L¹, L². Functionally similar resistance thermometers 15 and 16 are arranged within the conduit to be subject respectively to the temperature of the fluid before and after passing the heater 14, said resistance thermometers being connected in a Wheatstone bridge as shown and in a manner common to such meters. The resistances 17 and 18 constitute the other two legs of the Wheatstone bridge and are preferably fixed resistance equal ratio coils each having a resistance about equal to the resistance of one of the resistance theremometers 15 and 16. An adjustable balancing resistance 19 provides for compensating any inherent or accidental inequalities in resistance of the two legs 15 and 16 of the bridge.

The heating element 14 is connected to lines L¹, L² in series with a regulating resistance 48. The resistance 48 may be regulated to vary the heating effect of element 14. The regulating means is only diagrammatically illustrated as any suitable means may be used for this purpose. For instance, the resistance 48 may be varied by means of the control device shown in the aforementioned patent to Thomas to vary the heating effect. The Wheatstone bridge also receives current from lines L¹, L² as shown.

A resistance element 20, located within the conduit 13 and another resistance element 21 are arranged to be connected selectively in series with the resistance thermometer 16 under certain desired conditions. A switch 22 provides for selective inclusion of said resistances in said circuit at will. Also an adjustable resistance 23 is preferably connected in series with said resistance thermometer 16 to enable calibration of the meter to adapt the same to act upon fluids of different basic specific heats and the like. An additional resistance element 24 is arranged to be permanently in series with the theremometer resistance 15, whereas a resistance 25 of equal ohmic value is arranged to be connected in series with resistance thermometer 16 to counteract the effect of resistance 24 during balancing of the bridge preparatory to metering. A balancing switch 26 provides for including said balancing resistance 25 in circuit while simultaneously excluding all of resistances 20, 21 and 23 from the bridge circuit, thereby enabling balancing of the bridge in the usual manner. Resistance units 20 and 21 are also of about equal ohmic value, the former having a positive temperature co-efficient, that is to say, being adapted to increase its resistance with temperature rise. The other resistances on the other hand are of zero temperature co-efficient.

In the operation of the device the switch 26 is thrown to the upper position, the heater circuit being open, thus enabling balancing of the bridge in the absence of heat by means of the adjustable resistance 19.

A suitable balance having been secured as indicated by central positioning of the galvanometer needle G the switch 26 is thrown to its lower or running position, the resistance 25 being excluded from circuit and the adjustable resistance 23 being included. If now the meter is to operate upon a fluid whose temperature is between approximately 55° and 100° F. the switch 22 is moved to its upper position thereby including resistance 21 in circuit with the resistance thermometer 16 and excluding the resistance 20 from such circuit.

In such condition the effective temperature difference resistance is that of the resistance element 24 minus that of the resistance element 21 and is a constant value represented by the line 11 of Fig. 2.

If under these conditions the chemical constitution of the fluid or other similar basic factor is found to vary in a manner to cause variation in basic specific heat thereof, the resistance 23 may be adjusted at will to compensate for such variation, the effect thereof being that of shifting said line 11 slightly up or down without changing the slope of said line as indicated by the dotted lines of Fig. 2.

If, however, it is desired to operate the meter on a fluid whose temperature ranges between, for example, 100° and 130° F., the switch 22 is moved to its lower position thereby including the resistance element 20 in the circuit of the thermometer resistance 16 and excluding the element 21 from such circuit. Under such conditions the effective temperature difference resistance is then the difference of the resistance of element 24 minus that of element 20 and since the former of said elements has a constant resistance value, whereas the latter element has a positive temperature co-efficient the effective resistance will decrease as the temperature increases, giving the same effect as that of a negative slope temperature difference coil, as illustrated by the line 12 of Fig. 2.

Figs. 3, 4, 5 and 6 are illustrative of a method of and apparatus for securing the aforedescribed corrections automatically, that is to say, without necessitating the aforedescribed changeover for different ranges of basic temperature of the fluid.

The construction illustrated in Fig. 3 is in all essential respects the same as the construction just described and in the simple Thomas meter of the aforeindicated patent except for the different construction and arrangement of temperature difference and balancing resistances to be now described.

In this construction individual auxiliary resistance elements 30 and 31 are arranged within the fluid conduit to be connected in series with the respective resistance thermometers 15 and 16 during metering, a double pole switch 26$^a$ being provided for excluding both of said auxiliary resistances from circuit during balancing of the bridge and the like.

In practice the element 30 is constructed preferably of pure copper whereas the element 31 is constructed of pure nickel, or in certain cases a section of manganin wire will be substituted for a portion of the copper or nickel. Both copper and nickel are adapted to increase their ohmic resistance with increase in temperature but each in this respect exhibits characteristics different from those of the other. Thus, the curve representing the relation of resistance to temperature of copper is substantially a straight line as illustrated at 33 Fig. 4, whereas, the corresponding curve of nickel is substantially parabolic as illustrated at 34 in the same figure, while of course manganin is of substantially zero temperature coefficient.

The arrangement and proportioning of the two temperature difference resistances is such that the joint effective value thereof for temperature difference maintenance is at all times equal to the difference of the ohmic value of resistance 30 less that of resistance 31. Also it is apparent that by suitable proportioning of said resistance elements the curve illustrating successive values of such difference, that is to say the effective temperature difference resistance, may be caused to follow the aforedescribed curve 10 with substantial accuracy as illustrated at 35 in Fig. 5. Said curve 10, as will be recalled, represents the condition of perfect temperature difference compensation or correction of all variable factors which are functions of temperature and which tend to affect the accuracy of the meter.

The method in which the necessary materials, proportions and co-ordination of the resistance elements 30 and 31 may be determined is depicted particularly in Fig. 6.

In said figure the curve 34$^a$ is a section of the characteristic resistance temperature curve of nickel wire, the values X, AX and BX represent the value of such resistance at 60°, 85° and 110° F., respectively. The factors A and B are known or ascertainable constants for any particular supply of such wire. It is thus necessary to add to the individual values X, AX and BX other values $a$, $b$ and $c$ respectively taken from Fig. 4, such that the locus of the three sums shall be a straight line curve such as indicated at 33$^a$.

This line, being by hypothesis straight and the abscissæ between X and AX, and AX and BX being equal it is evident from the relation of similar triangles that
$(BX+c) - (AX+b) = (AX+b) - (X+a)$
therefore
$$BX - AX - AX + X = b - a - c + b$$
or
$$X(B - 2A + 1) = 2b - a - c$$
and
$$X = \frac{2b - a - c}{B - 2A + 1}$$

For one particular pair of thermometers and for one particular type of gas, the values $a$, $b$ and $c$ are known. Therefore, the value of X can be computed as well as AX and BX and then the values for the straight line curve 33$^a$ derived from values $X+a$, $AX+b$, and $BX+c$.

If this straight line 33$^a$ has a slope equal to or less than that of the resistance temperature curve of pure copper, the element 30 will be constructed of copper and manganin in proper proportions to give this slope, and element 31 will be pure nickel. However, if the straight line curve 33$^a$ for element 30 is steeper than the curve indicating resistance of pure copper, the manganin will be added to the nickel element 31 and the value can be determined as follows. $(BX+c) - (X+a) = g$ which is the constant value increase in ohms which is required of the copper coil 30 from 60° to 110°. $g = ZH$ where Z=resistance of pure copper resistance element at 60° F. and H is the percentage increase in resistance of copper from 60° to 110°. Therefore,
$$Z = \frac{g}{H}$$
and Z is the value for a copper resistance element which will give the desired slope. $Z - (X+a) = d$ which is the value of manganin to be added to the nickel of element 31. Therefore, the values of element 30 are $(a+X+d)$ at 60° and $(b+AX+d)$ at 85° and $(c+BX+d)$ at 110° and this element is pure copper. The values of element 31 are (X nickel $+d$ manganin) at 60° and (AX nickel $+d$ manganin) at 85° and (BX nickel $+d$ manganin) at 110°.

It is quite evident that other materials could be used for the design of these resistance elements and that it is not essential to work for a straight line characteristic, since a similar solution could be used for any other known regular curve.

Where the meter or the like is required to act upon or with reference to a gas which, due to superheating or other cause, is unsaturated as regards its vapor content, any errors or tendency toward error in the determinations due to such condition of the fluid may be obviated by the method and apparatus now to be described.

In accordance with such method it is proposed to arrange, in heat absorbing relation to the temperature difference resistance element which in operation is subjected to the higher temperature, a continuously moist wick or the like subjected to the moisture absorbing action of the fluid passing such element, whereby obviously said element is subjected to a cooling effect which is proportional to the degree of unsaturation of the fluid at the existing temperature, and such cooling of said element is utilized to effect the necessary correction of the results of the metering action.

Assuming substitution for the element 20 of Fig. 1, of an element adapted to be subjected to cooling action in the manner just described, the resistance element 21 being omitted or permanently excluded from circuit, it is apparent that the effective value of temperature difference resistance will be, as before, the difference of the ohmic value of element 24 less that of the element so substituted.

It being recalled that the element 24 is of zero temperature coefficient, it is apparent that, by proper selection or combination of the materials copper, nickel and manganin in the construction of the element substituted for element 20, the curve representing such value may be caused to exhibit such slope and contour as to coincide substantially with practically any desired portion or range along the ideal curve 10 of Fig. 2, while at all times subjected to the aforedescribed corrective action for obviating possible errors due to unsaturation of the fluid. Also if desired a plurality of such elements possessing different characteristics may be arranged in the relation occupied by the element 20 for inclusion in circuit with the resistance thermometer 16 selectively by means of a switch similar to switch 22, whereby the device may at will be adjusted according to the basic temperature of the fluid, precisely as explained in connection with Fig. 1.

The manner of designing and correlating such elements will be apparent from the description and formulæ relating to Figs. 4, 5 and 6.

Again assume that a temperature difference resistance element of the type just described be substituted for the element 31 of Fig. 3, it is apparent that the device as so modified may be caused to perform all of its aforedescribed functions and also to compensate for unsaturation of the fluid as in the aforedescribed modification of the construction of Fig. 1.

In Fig. 7 is illustrated a convenient form of apparatus for subjecting a standard form of temperature difference resistance element to such cooling action.

In said figure, a temperature difference resistance housing 40 of substantially standard construction is arranged to be screwed within the side of the fluid conduit 13, said housing being closed upon its inner end by means of a plug 41 screwed thereto. A suitable wick 42 is located about said housing and in intimate contact therewith. A cap 43 is located about the inner end of said housing and wick in a relation to provide beyond the plug 41 a reduced chamber 44 within which the terminal portion of the wick extends. In practice said cap is preferably provided with an axially located, threaded internal stud 45 adapted to take within a suitably located tapped recess in the plug 41, whereby the cap may be screwed home upon the end of the housing for permanent retention of the former while providing a regulable compression of the portion of the wick 42 located between said cap and plug.

An elongated tube 46 is arranged within the housing 40, having one end penetrating the plug 41 and the other end extending through a lateral portion of the housing 40 located exteriorly of the conduit 13 when the housing is assembled therewith. Said tube thus provides for introducing water within the chamber 44 and in contact with the wick 42 for moistening the latter.

The temperature difference resistance element 47 is located within the housing as illustrated, in accordance with standard practice.

What we claim as new and desire to secure by Letters Patent is:

1. The method of compensating for variations in the physical properties of a given medium, due to temperature changes therein, which consists in subjecting to said temperature changes a pair of resistors electrically connected in parallel the differential value of the resistances of which varies in the same characteristic manner as said physical properties throughout the total range of said temperature changes, and modifying the temperature of said medium in accordance with said variations in differential resistance value of said resistors, said differential resistance value having a negative slope characteristic throughout a given portion of said total range.

2. The method of determining the rate of flow of a fluid which consists in maintaining a substantially constant thermal change in the fluid between two controlling thermometer resistances located therein, and adding to the resistance of each of said thermometer resistances an auxiliary resistance which is variable in accordance with variations in temperature thereof to compensate for variations which would otherwise occur within the range in temperature throughout which the meter is effective, said auxiliary resistances being differentially related and being so constructed as to provide a negative slope characteristic of the differential value thereof under given temperature conditions.

3. The method of determining the rate of flow of fluids which consist in causing heat interchange between a body and the fluid, varying the rate of heat interchange in response to variations in the rate of flow of the fluid to maintain a substantially constant thermal change of the fluid in its passage between two thermometer resistances arranged one on each side of said body, and adding to the resistance of each thermometer resistance a resistance to compensate for errors which would otherwise occur within the range in temperature throughout which the meter is effective, at least one of said last mentioned resistances being variable in accordance with variations in temperature thereof whereby the differential resistance value of said last mentioned resistances has a negative slope characteristic.

4. In a fluid meter, a heating element for imparting heat to the fluid flowing therethrough, two resistance thermometers arranged one on each side of said heating element, and means for automatically varying the resistance of the circuits in which the respective thermometers are connected in accordance with variations in the temperature of the fluid to be heated to compensate for errors which would otherwise occur within the range in temperature throughout which the meter is effective, said means comprising a pair of auxiliary resistance elements to be connected in series with the respective thermometers and each arranged in the path of the flowing fluid, said auxiliary resistance elements having relatively different temperature-resistance coefficients to provide a negative slope characteristic of their differential resistance value under given temperature conditions.

5. In a fluid meter, a heating element for imparting heat to the fluid flowing therethrough, a Wheatstone bridge, a pair of resistances connected in two of the respective arms thereof and arranged in the path of said fluid on opposite sides of said heating element, and a pair of auxiliary resistances connected in series with said first mentioned resistances respectively and so located that their temperatures vary with the temperatures of said first mentioned resistances respectively, said auxiliary resistances having cooperatively related temperature-resistance coefficients such that the differential resistance value thereof has a negative slope characteristic within a given range in temperature variations of said fluid.

6. In a fluid meter, a pair of resistance thermometers for measuring the difference in temperature of two different points in a flowing body of fluid, said thermometers being substantially similar and constructed of the same resistance material, and a pair of auxiliary resistances connected in series with the respective resistance thermometers and each arranged in said flowing body of fluid, said auxiliary resistances being constructed of materials which vary their resistances in different characteristic manners in accordance with variations in temperature thereof to thereby compensate for variations in the specific heat and/or vapor content of the fluid upon variations in the basic temperature of the latter within the range in temperature throughout which the meter is effective.

7. In a fluid meter, a pair of resistance thermometers for measuring the difference in temperature of two different points in a flowing body of fluid, said thermometers being substantially similar and constructed of the same resistance material, and a pair of auxiliary resistances connected in series with the respective resistance thermometers and each arranged in said flowing body of fluid, said auxiliary resistances being constructed of materials which vary their resistances with variations in temperature thereof to thereby compensate for variations in the specific heat of the fluid upon variations in the basic temperature thereof, and means for varying the resistance of certain of said elements in accordance with the percentage vapor content of the fluid as metered.

In witness whereof, we have hereunto subscribed our names.

CLARENCE S. PINKERTON.
WILBUR H. GREENWOOD.